United States Patent [19]
Birt

[11] Patent Number: 4,799,422
[45] Date of Patent: Jan. 24, 1989

[54] MOTOR VEHICLE WINDOW VENTILATOR

[76] Inventor: Robert M. Birt, 1308 Washington Ave., Ruthven, Iowa 51358

[21] Appl. No.: 138,554

[22] Filed: Dec. 28, 1987

[51] Int. Cl.⁴ .............................................. B60H 1/26
[52] U.S. Cl. ....................................... 98/2.13; 160/372
[58] Field of Search ................... 98/2.12, 2.13, 93, 98, 98/99.7; 296/152; 160/127, 354, 372, 374

[56] References Cited

U.S. PATENT DOCUMENTS

| | | | |
|---|---|---|---|
| 1,588,653 | 6/1926 | Brownlee | 98/2.13 |
| 1,660,893 | 2/1928 | Smith | 98/2.13 |
| 1,810,044 | 6/1931 | Harris, Jr. | 98/2.19 |
| 1,813,756 | 7/1931 | Noppenz | 98/93 X |
| 1,825,437 | 9/1931 | Yeagle | 98/2.13 |
| 1,923,346 | 8/1933 | Watson | 98/93 |
| 2,641,501 | 6/1953 | Ensey | 98/2.13 |
| 2,715,866 | 8/1955 | Mousel | 98/2.13 |
| 2,841,069 | 7/1958 | Ginzburg | 98/2.13 |
| 2,949,842 | 8/1960 | Crandall | 98/2.13 |
| 3,292,521 | 12/1966 | Requa | 98/2.13 |
| 3,434,408 | 3/1969 | Rivers et al. | 98/2.13 |

Primary Examiner—Harold Joyce
Attorney, Agent, or Firm—Zarley, McKee, Thomte, Voorhees & Sease

[57] ABSTRACT

A motor vehicle window ventilator is provided which has a frame having a raised central portion to fit into at least a part of the encasement of the motor vehicle window, a fitting member attached to the frame by a resilient member, the fitting member being mateably insertable into at least a part of the encasement of the motor vehicle window. The bottom portion of the frame includes an indentation for receiving an edge of the motor vehicle window. An optional locking device can be attached to the frame and includes an elongated member which extends to and is connectable to the locking device of the motor vehicle.

9 Claims, 2 Drawing Sheets

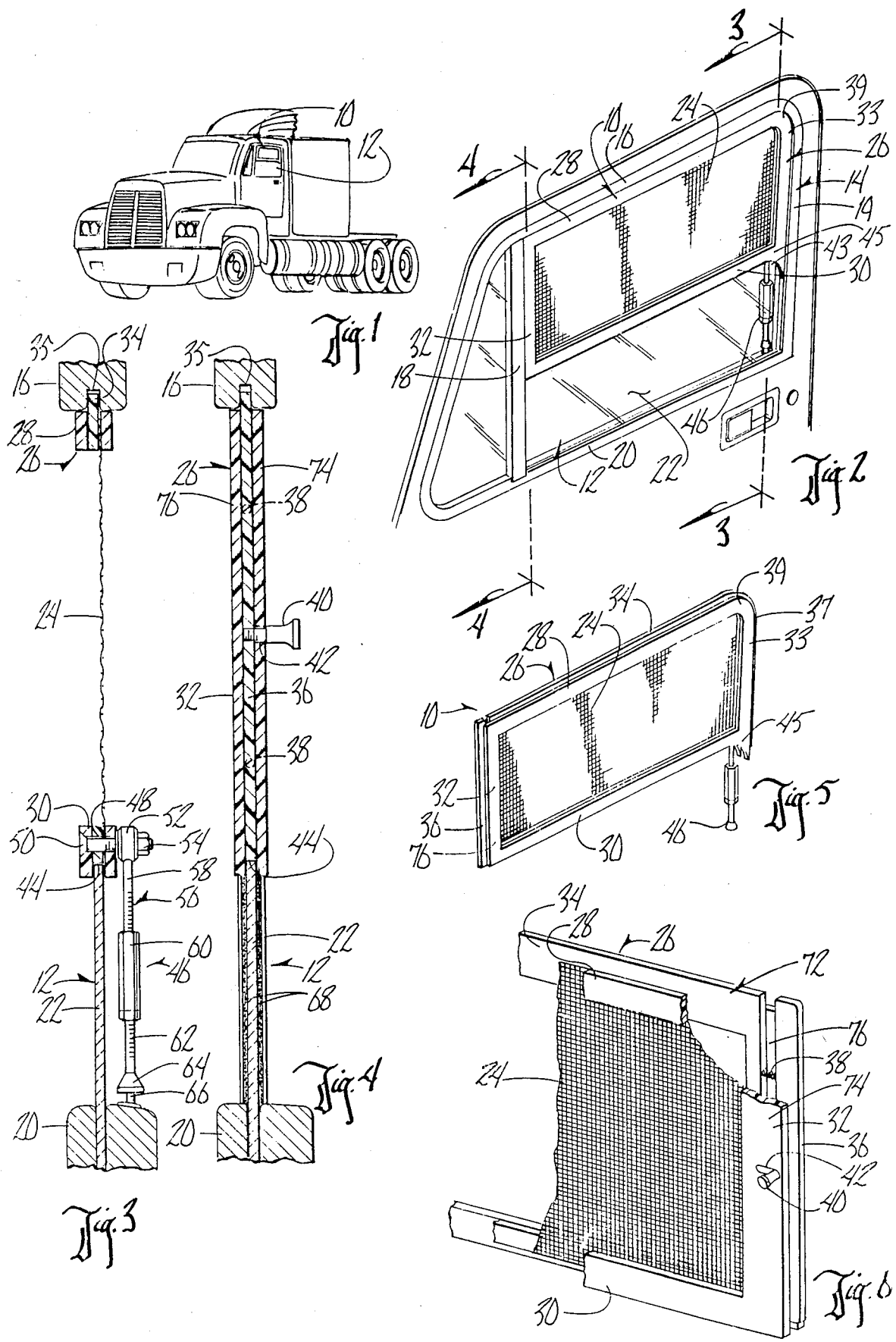

MOTOR VEHICLE WINDOW VENTILATOR

BACKGROUND OF THE INVENTION

A continuing problem relating to motor vehicles is adequate ventilation while keeping out unwanted dust, insects, and other objects. Ventilators for windows in motor vehicles have been developed which allow air to enter into the cabin of the vehicle through small louvers or partial screens while keeping out elements and unwanted objects.

The window ventilators in use until now, however, have had a number of draw-backs. The means to adapt ventilators to various window sizes and encasements have proven cumbersome and awkward. One method of providing for an adaptable ventilator is to have the ventilator consist of two parts which can be shortened or lengthened. Some have attempted to provide for separate pieces which attach onto the ventilator, while others have addressed the problem by providing for projections which fit in the channels in the window encasement.

Other problems exist with known attempts at window ventilation of motor vehicles. Many utilize louvers, which do allow ventilation to a certain degree (not to a maximum degree), but also allow insects to enter the interior of the motor vehicle. Additionally, louvers disrupt or impair vision if placed within the normal window area of a motor vehicle. The effectiveness of ventilation utilizing louvers is also questionable when a motor vehicle is stopped or moving slowly, so that there is minimal pressure differential between the interior of the motor vehicle and the exterior.

This invention provides for an adjustment device on at least one end of the frame which allows the entire ventilator to fit within the vehicle window encasement, and also adapts to the different widths of motor vehicle window openings.

The adjustment device provides for a close fit with the window of the motor vehicle and eliminates any openings. In addition, it provides for an antitheft device connected to the ventilator. Furthermore, the present invention achieves the dual advantages of maximum ventilation while blocking intrusion of insects, all with minimal disruption or impairment of vision through a vehicle window.

Accordingly, it is an object of this invention to provide for a ventilating device for motor vehicles.

A principal object of the present invention is to provide for a ventilating device as above described which solves or improves over the problems and deficiencies in the art.

A further object is to provide for a ventilating device which is easily insertable and removable.

A further object is to provide for a ventilator device which fits snugly between the vehicle window encasement and window pane, and eliminates openings between the ventilator and the encasement and pane.

A further object is to provide for a ventilator device which provides maximum ventilation.

A further object is to provide for a ventilator device which disallows entry of insects.

A further object of the present invention is to provide a ventilator device which presents minimal visual disruption or impairment.

As a further object, the present invention also optionally provides for a device connected to the ventilator prohibiting unlocking of the vehicle when the ventilator is in place.

A further object of the present invention is to provide a ventilator device which is easy to use, durable, and economical.

Another object of the present invention is to provide a ventilator device which can be easily manufactured to fit a variety of different size of motor vehicle windows.

These and other objects, features, and advantages of the present invention will become more apparent with reference to the accompanying specification and claims.

SUMMARY OF THE INVENTION

A vehicle window screen ventilator is disclosed which is capable of being manufactured to be used with various sized motor vehicle windows and which can also be utilized with a locking device. A screen is placed within a frame which includes a raised flange portion for adaptingly fitting into at least the top of a motor vehicle window encasement, a member on at least one side attached to the screen frame by a resilient means for fitting into corresponding portions of the window encasement, and the bottom portion of the screen frame having an indentation or channel for receiving the motor vehicle window so that the screen frame may be fitted into place in the encasement and the vehicle window raised to aid in support of this frame. A locking device can also be used with the screen. If used, it is attached to the bottom of the frame and includes a lower portion which fits over the vehicle door lock stem (if the motor vehicle has the same), to prevent tampering with the vehicle lock.

In this manner motor vehicles may be ventilated to allow air to circulate in, through and out of the cabin of the vehicle, while preventing insects, bugs and unwanted objects from entering. The locking device discourages removal by children, tampering and break-ins while the screen is in place.

BRIEF DESCRIPTION OF THE DRAWINGS

FIG. 1 is a perspective view of a motor vehicle illustrating the use of a preferred embodiment of the window screen ventilator.

FIG. 2 shows, in isolated perspective, the motor vehicle window encasement and window of the motor vehicle of FIG. 1, with the window screen ventilator in place.

FIG. 3 is an end cross-sectional view shown along line 3—3 of FIG. 2 showing portions of the window and screen, and details of the locking device.

FIG. 4 is an end cross-sectional view taken along lines 4—4 of FIG. 2 showing the fitting means and gripping means and the three-part construction of the frame.

FIG. 5 is a perspective view of the window screen ventilator and locking device removed from a motor vehicle window encasement.

FIG. 6 is a partial perspective view of the screen ventilator showing the fitting means and gripping means in detail, and the frame and screen construction.

DETAILED DESCRIPTION OF THE PREFERRED EMBODIMENT

Figure 7:
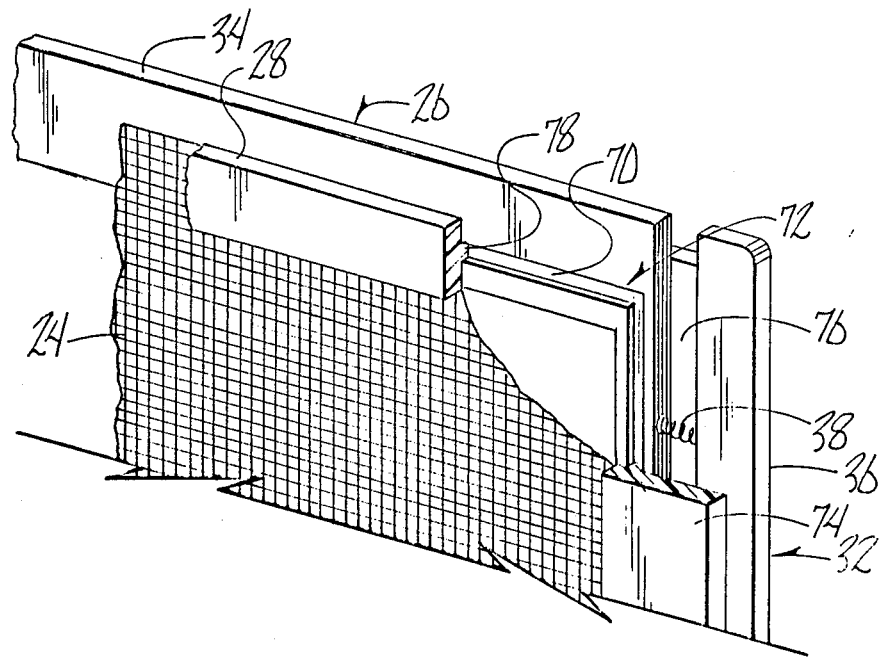
FIG. 7 is a partial perspective view of the frame showing one method of holding the screen in place.

With respect to the drawings, a preferred embodiment will now be described. Like parts will be identified by like reference numerals.

FIG. 1 shows the window screen ventilator 10 in place in the vehicle window 12 of a semi-truck trailer. FIG. 2 is an enlarged view of the window screen ventilator 10 in place in the vehicle window 12. The vehicle window 12 includes an encasement 14 ordinarily used to receive and track the glass pane 22 of the vehicle. The encasement 14 includes a top encasement section 16, forward and rear side encasement sections 18 and 19, and a bottom section encasement 20. In this view, the glass 22 is raised partially in the encasement 14 to engage the window screen ventilator 10. It can be seen that ventilator 10 fits securely and essentially sealingly to disallow any passage of materials or insects between the abutting portions of ventilator 10 with window encasement 14. Additionally, the profile of ventilator 10 is such that it provides minimal disruption of vision out of vehicle window 12.

It is particularly noted that the invention is easily adaptable to all types of motor vehicle windows. For example, in the embodiment utilized with respect to the motor vehicle window 12 shown in FIGS. 1 and 2, the perimeter of ventilator 10 is basically rectangular, except for the rounded upper and rearward corner. This requires the upper rearward corner of ventilator 10 to be rounded in conformance with the particular vehicle window 12, and the lower rearward corner of ventilator 10 to complementarily curve downwardly so that no gaps exist between window 12, window encasement 14, and window ventilator 10. The invention can thus be easily manufactured to be adapted to most other window shapes, including windows that are not planar, but have some curve in their surface.

Further details of the window screen ventilator 10 are shown in FIG. 5. Screen 24 is held within frame 26. The frame 26 itself includes an upper member 28, a bottom member 30, and forward and rearward side members 32 and 33. Upper member 28 includes a raised central portion 34, while rearward side member 33 also includes a raised central portion 37. Center portions 34 and 37 may take a number of forms to accomplish their purpose of conformably fitting into the conventional channel 35 (see FIGS. 3 and 4) in the encasement 16 of the vehicle window 12. Center portions 34 and 37 may be a raised flange extending along upper and rearward side members 28 and 33 of the frame 26 as shown in FIG. 5.

On the forward side member 32 of the frame 26 is operatively attached a fitting means 36. The fitting means 36 is attached to the frame 26 by means of a biasing member, here being springs 38. Springs 38 are resilient so that fitting means 36 can be manually compressed towards frame 26. This allows the total width of ventilator 10 to be reduced so that it can be easily inserted into vehicle window 12. Fitting means 36 can then be released to mate into channel 35 in encasement 18 to close any gaps between ventilator 10 and encasement 18.

The fitting means 36 may also include a handle or gripping means 40 which is attached to the fitting means 36 and extends through an elongated slot 42 contained in the side member 32.

The fitting means 36 is of a shape and size to fit into a side encasement 18 of the vehicle window 12. Springs 38 and gripping means 40 allow for the fitting means 36 to be manually pulled to a retracted position to aid in placement of the window screen ventilator 10 into the vehicle window 12. When the screen ventilator 10 is being placed into the vehicle window 12, the gripping means 40 may be used to retract the fitting means 36. After placement of the window screen ventilator 10 into the vehicle window 12, the gripping means 40 may be released and the fitting means 36 slides into the side encasement 18.

The bottom member 30 of the frame 26 includes a channel 44. This channel 44 is intended to receive and guide the glass 22 of the vehicle window 12. In this manner, the window screen ventilator 10 is placed into the upper portion of the vehicle window 12, with the central portions 34 and 37 fitting into channel 35 in the upper and rearward side members 28 and 33 of top and rearward side encasements 16, the fitting means 36 fitting into the forward side encasement 18, and the window glass 22 sliding up into the channel 44, allowing the screen ventilator 10 to be securely held in place.

FIGS. 1, 2 and 5 show that the ventilator 10 can easily be manufactured so that frame 26 can matingly fit within many types of vehicle window encasements.

The preferred embodiment of FIGS. 1, 2 and 5 provides that the rearward side member 33 of the frame 26 includes a rounded portion 39 at its intersection with upper member 28, which conforms to the curved corner of window encasement 14, and a downwardly curved portion 45 at the intersection of rearward side member 33 and bottom member 30 of frame 26 of the same shape as the curve portion 43 of the glass 22. The curved portion 45 again conforms the ventilator 10 with vehicle window 12 to prevent any gaps or spaces between the outside and inside of the motor vehicle.

It is to be understood that the invention can take on many configurations. Frame 26 can be made out of many different materials, and take on the shape of virtually any type of conventional vehicle window. The preferred embodiment shown in the drawings is given by way of example only. Frame 26 can be formed to not only have different shaped perimeters, but could also be formed so that sides of the frame conformed to non-planar curved (that is, convex or concave sides) vehicle window encasements. It is also to be understood that frame 26 can be made out of a unitary piece of material, with fitting means 36 being attached by resilient means. Alternatively, the frame can be made of different parts according to design choice. Screen 24 can be held into frame 26 by a variety of different means. Screen 24 can be made of a variety of different materials.

A locking means 46 is shown attached to window ventilator 10 in FIGS. 2 and 5, and in operative position between ventilator 10, and conventional door lock 66 in FIG. 2.

A preferred embodiment of the locking device 46 is demonstrated in FIG. 3. The bottom member 30 of frame 26 is provided with a hole 48 for receiving a bolt 50. The bolt 50 passes through an eyelet 52, which allows the locking device 46 to swivel about eyelet 52. Eyelet 52 is held in place on bolt 50 with a nut 54. Attached to this eyelet 52 is a turnbuckle 56, which includes an upper threaded shaft 58, a buckle 60 and a separate lower threaded shaft 62. A holding means 64 is provided at the end of the lower threaded shaft 62, and, in this form of the embodiment, is shown cone-shaped.

It is designed to fit over the conventional motor vehicle door lock 66. When ventilator 10 is installed within encasement 14 of vehicle window 12, and vehicle window 22 is rolled up into channel 44 of ventilator 10, locking means 46 can be pivoted towards door lock 66, buckle 60 (and if needed, lower threaded shaft 52) turned, and lower threaded shaft 62 extended to rigidly place holding means over door lock 66. In this manner, the locking means 46, when in place over the motor vehicle door lock 66, prevents the motor vehicle door lock 66 from being raised and the door opened. It also assists in holding ventilator 10 in place and resists its removal. The turn buckle 56 and eyelet 52, which is capable of swiveling, aids in removal of the locking device 46.

FIGS. 3 and 4 show in more detail how ventilator 10 is inserted and retained within encasement 14 of vehicle window 12. Additionally, along with FIG. 6, FIGS. 3 and 4 depict one way in which frame 26 can be constructed. By referring specifically to FIG. 6, it can be seen that frame 26 consists of a generally rectangular center piece 72 which functions as center portions 34 and 37 previously described; that is, serves to matably fit within channel 35 of vehicle window encasement 14. Identical rectangular frame halves 74 and 76, of similar shape as center piece 72 are mounted so as to sandwich center piece 72. As can be seen, screen 22 is secured in place by sandwiching between frame half 74 and center piece 72.

Additionally, channel 44 is formed by extending the bottom edges of frame halves 74 and 76 past center piece 72. Furthermore, fitting means 36, attached to center piece 72 by springs 38, is guided and slidably moves between outward extended side edges of frame halves 74 and 76. This serves to present guides for and make operation of fitting means 36 accurate, and increases the durability of ventilator 10. Frame halves 74 and 76 can be attached to center piece 72 by means known within the art. Examples of such means are bolts, screws, glue, and other fastening means.

FIGS. 4 and 6 show the gripping means 40 attached to the fitting means 36 and passing through the elongated slot 42 provided in the forward side member 32 of the frame 26. In FIG. 4, the glass 22 is shown in a raised position engaging the channel 44. The glass 22 is cushioned by felt bumpers 68 ordinarily provided in the encasement 14 of a motor vehicle window 12.

Figure 8:
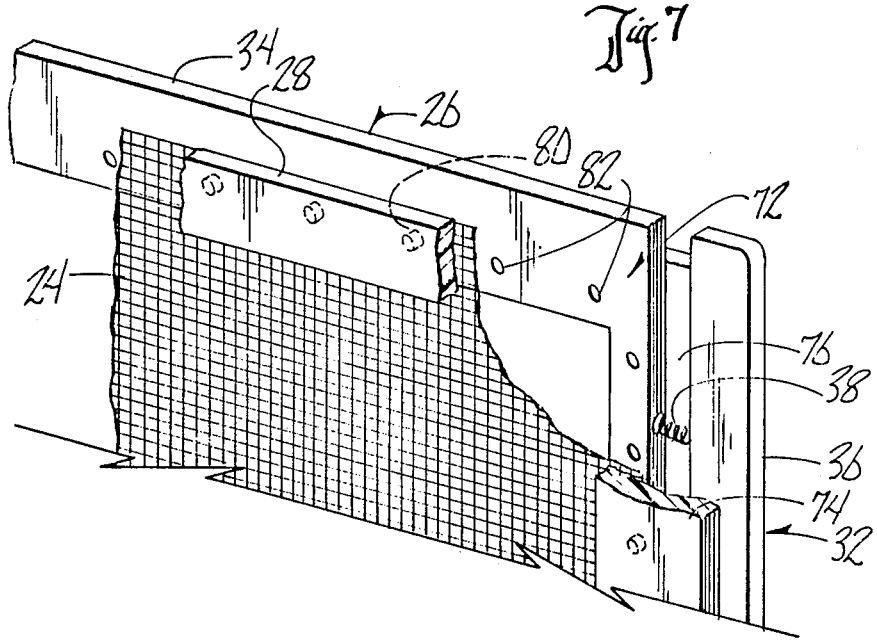
FIG. 8 is a partial perspective view of the screen showing another method of holding the screen in place on the frame.

FIGS. 7 and 8 show two means of holding the screen 22 in place. One method includes providing the center piece 72 with grooves 70, and frame 26 with projections 78. The screen 22 is placed between the center piece 72 and the frame 26, and projections 72, by frame fit, holds the screen 22 against the grooves 70, preventing slipping of the screen 22. Another method is shown in FIG. 8 in which pins 80 and holes 82 are used in place of the grooves and projections. Other methods are possible.

It will be appreciated that the present invention can take many forms and embodiments. The true essence and spirit of this invention are defined in the appended claims, and it is not intended that the embodiment of the invention presented herein should limit the scope thereof.

For example, as has been mentioned, the invention can be applied to many different types of vehicles including automobiles, trucks, and semi-tractors. An advantageous example of its use with semi-tractors is as follows. Many semi-tractors are utilized for overnight transport. Therefore, it is common that drivers of these vehicles must stop for sleep from time to time. Many times the drivers are precluded from resting or sleeping with the windows rolled down because of either insects or temperature extremes. Moreover, if the windows are kept up, for driver comfort, temperature control and ventilation of the cab are accomplished by running the truck's engine and operating either the air conditioner, ventilation system, or heater according to need. Significant problems exist because the truck windows must be rolled up. One example is that for long sleeping periods, drivers many times must awaken themselves to check to see if the truck is operating within its normal parameters. They must check to see if such things as water temperature, oil pressure, and other engine factors are operating normally, because if not, tremendous risk exists of damaging the extremely expensive engines for these vehicles.

Therefore, the use of ventilator 10 in many situations would eliminate the need to run semi-tractor engines during rest periods for the driver, and thus eliminate periodic monitoring of the engine's operation. Additionally, it would allow a significant decrease in pollution, particularly at truck stops where many of these vehicles are concentrated. Moreover, it would represent a significant savings in fuel costs, and decrease the amount of hours the engines are operated from year to year.

The value of ventilator 10 with respect to conventional automobiles is also evident. Pets can be left in cars during warm weather to give them ventilation, while at the same time precluding them from escaping from the car. Similar advantages exist with leaving small children in the car during warm weather. Ventilator 10 is especially useful in eliminating fears of carbon monoxide poisoning, by eliminating the need to run an automobile engine (or any type of motor vehicle engine) when fresh air ventilation is sufficient.

Ventilator 10 can be of many different shapes, sizes, and configurations, to fit many different types of vehicles. Additionally, ventilators 10 can be specifically directed for different uses. A very narrow, small ventilator 10 could be used for minimal ventilation, but for maximum security purposes. A very small ventilator 10 would provide adequate ventilation for most purposes, but would not be susceptible for easy entrance by thieves or undesired persons.

On the other hand, larger ventilators 10 can function for better ventilation and can therefore fill up more of the vehicle window.

It is also to be understood that the position of the fitting means, and its size, can be varied according to different uses. For example, the fitting means might be positioned along the rearward edge of the frame 26, instead of the forward edge. Alternatively, all of the center portions might be made to be attached to frame 26 by springs.

Frame 26 can also be made to different sizes, widths, and thicknesses. To minimize visual obstruction, frame 26 should be made rather narrowly. However, to insure adequate strength, and yet not inhibit visibility, frame 26 could be made of transparent materials such as plexiglass.

It can therefore be seen that the invention accomplishes at least all of its stated objectives. The invention provides a valuable window ventilator for motor vehicles which is adaptable to many types of motor vehicles and uses, easy to insert and remove, durable, and economical.

What is claimed is:

1. A ventilator for use in a motor vehicle window having an opening, a window pane movable within the opening, and a window encasement having an upper encasement channel and side encasement channels, the ventilator comprising:

a first outer frame having an upper member, a lower member, and forward and rearward side members connecting said upper and lower members;

a second inner frame having an upper member, a lower member and forward and rearward side members connecting said upper and lower of the members of same shape and size as said first frame;

a third outer frame having an upper member, a lower member and forward and rearward side members connecting said upper and lower of the members and being of the same size and shape as said first and second frame, each of said frames having an open center;

said second frame positioned between said first and third frames and further positioned upward and rearward from the first and third frames to form a raised center in said upper and rearward side members and to form a channel in said lower and forward side members;

a screen secured in said frame and spanning said open center;

a fitting means adapted to conformably fit into at least one of the side encasement channels of said motor vehicle window encasement;

said fitting means placed between said forward members of said outer frames so that no openings remain between said frames, said window encasement and said window pane;

a resilient means connecting said fitting means to said forward side members.

2. The ventilator of claim 1 further comprising an opening in one of said forward side members of said first or third frames, a gripping means connected to said fitting means and passing through said opening.

3. The ventilator of claim 1 wherein said screen may be secured between said outer first and inner second frames or between said inner second and outer third frames.

4. The ventilator of claim 3 wherein said outer frame securing said screen has a side surface facing said inner frame;

said inner frame has a side surface facing said outer frame securing said screen;

said side surface of said outer frame has a protrusion extending laterally toward said inner frame;

said side surface of said inner frame has a channel therein to receive said protruding portion of said outer frame so that said screen is secured by placement of a portion of said screen between said channel and protrusion.

5. The ventilator of claim 3 wherein said side surface of said inner second frame has a plurality of indentations therein, said side surface of said outer frame securing said screen having a plurality of protruding pegs of a size and shape to fit into said indentations to secure said screen.

6. A ventilator for use in a motor vehicle window having an opening, a window pane movable within the opening, and a window encasement having an upper encasement channel and side encasement channels, the ventilator comprising:

a frame having an upper member, a lower member, and two side members;

a screen secured in said frame;

said upper member having a raised center adapted to slidingly fit into the upper window encasement channel;

said lower member having a channel to receive an edge of the window pane;

said side members connecting said upper and lower members;

a fitting means adapted to conformably fit into at least one of the side encasement channels of said motor vehicle window encasement;

a resilient means connecting said fitting means to at least one of said side members of said frame;

a locking device connectable to said ventilator and engageable with a motor vehicle locking means, said locking device comprising an elongated member having two ends, first connecting means to connect one of the said ends of said elongated member to said ventilator, second connecting means attached to the other end of said elongated member for placement over said motor vehicle locking means, adjustment means on said elongated member for adjusting the length of the elongated member.

7. A device for ventilating vehicles having windows which can be moved up or down within a window framework, said framework including channels to receive the edges of the window, comprising:

a ventilator frame having an outer perimeter closely conforming to the inside perimeter of the window framework;

a screen means secured in the ventilator frame for allowing air to pass;

flange means on at least a portion of the outer perimeter of the ventilator frame for matable insertion into corresponding portions of the channels of the window framework;

channel means on at least a portion of the outer perimeter of the ventilator frame for matable reception of the top edge of the window;

fitting means mounted by a spring on a portion of the perimeter of the frame, for matable insertion into a corresponding channel of the framework, said fitting means resiliently held by said spring and movable from a normal extended position away from the frame, to a retracted position adjacent the frame, said portion of said frame on which said fitting means is mounted having a portion extending laterally outwardly to cover said spring and a portion of said fitting means to allow insertion of the frame into the window framework, and the extension to completely cover the window opening.

8. A device for ventilating vehicles having windows with glass window panes movable upwardly and downwardly in a window opening, the side edges being movable along retaining side channels in the sides of the vehicle window framework, the top edge of the pane being insertable into a top channel in the vehicle window when the window is sealingly closed, the invention comprising:

a ventilator frame having top, bottom, and first and second side members having an outside perimeter closely corresponding with the inner edges of the framework defining the window opening;

a screen means secured in the frame;

flange means extending from top and said first side member, for matable insertion into the channels;

a slot on the bottom member for matable insertion of the top edge of the window;

a slot on said second side member;

a fitting member for matable insertion into one of said side channels in said vehicle window at least a portion of said fitting means placed in said slot on said second side member;

said second side member including resilient means allowing said fitting means to move between an extended position and a contracted position;

said resilient means holding said fitting means in a normally extended position;

said fitting means allowing the edges of the frame of the ventilator to be inserted into channels of the window opening when the window pane is retracted downwardly, the window pane then being movable upwardly until the top edge enters into the slot on said bottom member, said ventilator being configured to sealingly and completely fill the window opening.

9. A ventilator for use in a motor vehicle window having an opening, a window pane movable within the opening, and a window encasement having an upper encasement channel and side encasement channels, the ventilator comprising:

a frame having an upper member, a lower member, first and second side members connecting said upper and lower members and an open center;

said upper member having a raised central portion;

said first side member having a raised central portion;

said central portion of said upper member slidingly removably fitting in said upper window encasement channel;

said central portion of said first side member slidingly removably fitting one of said window side encasement channels;

said lower member having a central channel formed therein to receive an edge of said window pane;

fitting means conformably removably fitting into the other of said window side encasement channels;

spring means connecting said fitting means to said second side member of said frame;

said fitting means movable between a first extended position and a second contracted position;

said spring means urging said fitting means to said first extended position so that said ventilator may be fit into various sized motor vehicle windows.

* * * * *